United States Patent [19]

Yoshizawa et al.

[11] 4,275,909
[45] Jun. 30, 1981

[54] FLEXIBLE PLASTIC PIPE JOINT

[75] Inventors: Tadao Yoshizawa; Masayuki Sakaguchi, both of Sakai, Japan

[73] Assignee: Kubota Ltd., Osaka, Japan

[21] Appl. No.: 961,558

[22] Filed: Nov. 17, 1978

[30] Foreign Application Priority Data

Nov. 22, 1977 [JP] Japan .......................... 52-157237[U]

[51] Int. Cl.³ ............................................ F16L 17/00
[52] U.S. Cl. .................................. 285/110; 285/231; 285/260; 285/345; 285/423
[58] Field of Search ............... 285/110, 260, 423, 345, 285/DIG. 11, 231; 277/227, 228, DIG. 2, 207 A

[56] References Cited

U.S. PATENT DOCUMENTS

| | | | |
|---|---|---|---|
| 3,539,205 | 11/1970 | Johnson | 285/260 |
| 3,791,678 | 2/1974 | Putter | 285/110 |
| 3,809,412 | 5/1974 | Glover | 285/260 X |
| 3,856,315 | 12/1974 | Stansbury | 285/110 X |
| 3,887,674 | 6/1975 | Oostenbrink | 285/110 X |
| 3,938,834 | 2/1976 | Oostenbrink | 285/423 X |
| 4,133,563 | 1/1979 | Yamazuki | 285/231 |

Primary Examiner—Dave W. Arola
Attorney, Agent, or Firm—Oblon, Fisher, Spivak, McClelland & Maier

[57] ABSTRACT

A synthetic resin pipe joint having front and rear inclined walls defining a packing holding annular groove is provided with softness and elasticity sufficient to cause flattening deformation on impingement with a pipe contained therein, and expansion of a gap between this pipe and the inner circumferential face of the pipe joint is effectively prevented. On overall flattening deformation of the pipe joint, the front and rear inclined walls are similarly deformed and a packing contained therein is stably deformed with the deformation of the inclined walls without causing distortions in the packing. Because of such high elasticity and flexibility as not possessed by rigid joints, a pipe line can be effectively constructed by using this pipe joint.

10 Claims, 16 Drawing Figures

FIG.9
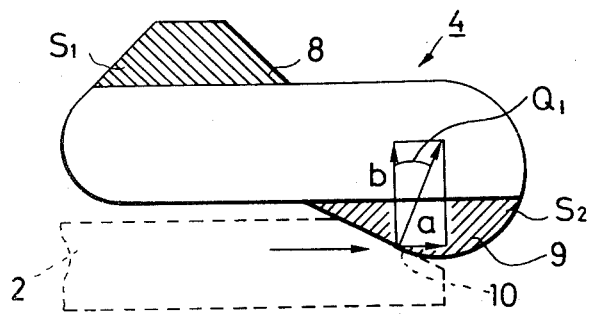
FIG.10 FIG.11
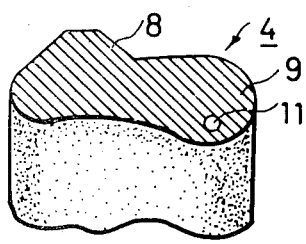 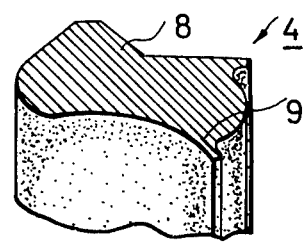
FIG.11a FIG.11b
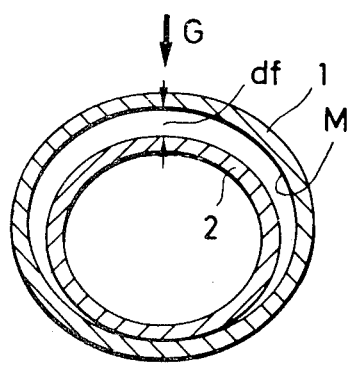 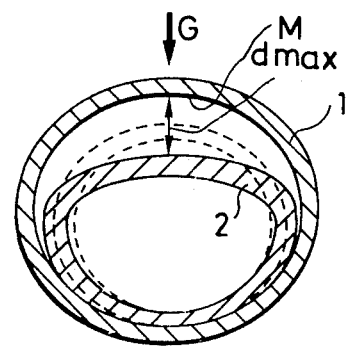

FLEXIBLE PLASTIC PIPE JOINT

BACKGROUND OF THE INVENTION

(1) Field of the Invention

The present invention relates to a flexible synthetic resin pipe joint capable of deformation under bending. More particularly, the invention relates to a flexible synthetic resin pipe joint comprising a joint wall capable of flattening deformation under application of external compression, which defines a packing holding annular groove, and a packing contained in said annular groove capable of flattening deformation, said packing having such structure that the packing is capable of deformation in follow-up of the flattening deformation of the annular groove and is stably retained in the annular groove. In this flexible pipe joint, the joint wall and packing are combined so that there can be attained a structural relationship generating a co-operative action complying with external compression causing deformation.

(2) Description of the Prior Art

A pipe joint comprising a pipe inserting spigot and a pipe receiving socket or faucet, which are connected to each other through a packing, is different from fixed joints such as glued joints and mechanical joints insofar as it is allowed to expand or contract in the axial direction. Especially in case of a pipe joint comprising a large-diameter portion 3 leaving a free space from the periphery of the top end of a pipe inserting spigot 2 in the interior portion of the inner face of a pipe receiving socket 1 as shown in FIG. 1, since the pipe inserting spigot 2 is allowed to be deformed in the bending direction as indicated by an imaginary line, and because of this deformability as well as elasticity in the axial direction attained by connection through a packing 4, excellent flexibility is attained in the joint. In this joint, since an external force applied to the joint is absorbed by expansion, contraction and bending of the joint, there can be attained an excellent effect of preventing occurrence of such problems such as braking in the joint. The packing 4 disposed in a joint of this type should be stably maintained at an appropriate position and should have sufficient durability so that the intended water tightness can be effectively exerted irrespectively of expansion, contraction and bending of the joint. Further, it is technically important that at the step of insertion and connection of the pipe inserting spigot 2, the packing 4 should be prevented from coming off or separating from the attachment position. Accordingly, there have heretofore been proposed various improvements to be made on the structure of the packing per se, the packing attaching groove or the like for setting the packing at an appropriate position and increasing the durability of the packing (long-time maintenance of elasticity).

A most basic structure of the socket in the joint of this type is shown in FIG. 2. A packing attaching groove 5 is formed on the inner face of the end portion of a pipe receiving socket 1 to improve the setting property of a packing 4. In this structure, however, it happens that at the insertion and connection step, the top end of a pipe inserting spigot 2 presses the packing 4 and the packing 4 comes off or separates from as shown by chain lines, resulting in reduction or loss of the water tightness. This defect may also take place when the joint is deformed in the direction of expansion and contraction after completion of the connection.

FIG. 3 is a view illustrating an improvement of the structure shown in FIG. 2, in which the shape of the inner face of the packing 4 is changed so as to eliminate this defect. However, no particular improvement over the structure shown in FIG. 2 is attained by the structure shown in FIG. 3. In the examples shown in FIGS. 4 and 5, the shape and structure of the packing 4 as well as the shape of the packing attaching groove 5 are improved and attainment of certain improving effects can be expected. In this instance, a packing supporting portion 5a shallower than the packing attaching groove 5 and a packing anchoring portion 5b' deeper than the packing attaching groove 5 are formed, and materials constituting the packing 4 are changed with the central portion of the cross-section serving as the boundary. Namely, the packing 4 is composed of a hard rubber 4b on the side fitted in the anchoring portion 5b' and is composed of a soft rubber 4a on the side facing the supporting portion 5a', whereby the setting property of the packing 4 and the water tightness-retaining property and durability are improved. However, it has been confirmed that as this packing receives external forces repeatedly on contraction, expansion and bending of the joint, cracks are formed in the boundary region between the soft rubber 4a and the hard rubber 4b, and finally, the soft rubber 4a and hard rubber 4b are separated from each other and the function of the packing is lost.

In the examples illustrated in FIG. 6, a tongue portion 4c is formed on the packing 4 to enhance the water tightness while moderating the insertion resistance. In this instance, molding is difficult because of the complicated shape and configuration of the packing 4, and the tongue piece 4c is readily made brittle by corrosive components and bacteria during transportation of fluids and no satisfactory durability can be obtained.

As will be apparent from the foregoing illustration, there has not yet been developed a satisfactory joint structure in which a packing is prevented from coming off or separating from a predetermined position at the insertion and connection step with the packing being set at an appropriate position after completion of the connection to maintain a high degree of water tightness for a long time and with the elasticity and bendability of the joint being a assuredly maintained. In order to attain this object, it is necessary to further stabilize the sealing function of a soft joint by making such improvements that certain relationships will be established among the structural characteristics of the shape of the packaging attaching groove, the sectional structure of the packing, the hardness of the packing and the chamfer angle of the top end of the pipe inserting spigot.

SUMMARY OF THE INVENTION

The present invention provides a synthetic resin pipe joint for constructing a pipe line which is distinguishable over a metal pipe line constructed of metal pipes having a high rigidity and pipe joints therefor and in which the elasticity and softness of synthetic resin pipes having an inner diameter of 75 to 800 mm can be effectively utilized as merited and no defects are caused by such elasticity and softness characteristics. In order to provide such pipe line, the synthetic pipe joint of the present invention should have specific elasticity and softness characteristics as described below.

The quantity of deformation of a synthetic resin pipe under an external force G such as estimated fluid presure or passage load is restricted to less than 10%, ordinarily 3 to 5%, of the diameter of the pipe and a softness complying with such deformation in the synthetic resin pipe is given to a synthetic resin pipe joint. In the pipe joint satisfying this requirement, the structure of the joint wall and the structural configuration of the packing are determined so that a sufficient durability to the inner pressure of water can be maintained and the supporting action of the joint wall to the packing can be stably maintained to hold the packing stably even under telescopic displacement, eccentric movement and deformation in the horizontal direction in the joint.

A standard size of the basic gap estimated for the contact surface of the joint is calculated from the quantity of deformation of the synthetic resin pipe, which corresponds ordinarily to 5% of the diameter thereof and the diameter of the annular inner circumferential face M of the socket of the joint, which corresponds to a size larger by 0.1 to 2% than the diameter of the synthetic resin pipe.

When an external force G is imposed on the pipe 2, this pipe 2 is made eccentric (df) from the annular inner circumferential face M of the socket of the joint (see FIG. 11-A), and when deformation in the horizontal direction is thus caused (see FIG. 11-B), the maximum gap dmax between the inner circumferential face M and the pipe 2 is as large as 5.1 to 7% of the diameter of the pipe 2. More specifically, in case of a pipe having a diameter of 100 mm, a gap dmax of 5.1 to 7 mm is formed between the pipe 2 and the annular inner circumferential face M of the socket (see FIG. 11-B), though the value differs to some extent depending on the structure. In the conventional pipe joints of this type, a defect is caused in that the packing protrudes into the thus formed large gap, and this defect is brought about when the rigidity is high and it is construed such that no substantial deformation takes place.

Such increase of the gap on one side can be prevented by imparting an appropriate softness or elasticity to the joint. Namely, if flattening deformation of the pipe enhances the pressure of impingement to the annular inner circumferential face of the joint (actually through the packing) to cause elastic deformation in the circumferential portion of the joint, convex deformation parts Y where deformation is readily caused to appear at symmetric points of the annular section (see FIG. 12) and the axes of the pipe and joint are brought close to each other. As a result, the gap dmin is halved by concave deformation parts X located at opposite positions and biased increase of the gap on one side can be prevented. Even when the quantity of flattening deformation of the pipe becomes as large as 5% of the diameter thereof, the gap dmin caused by this deformation is restricted to ½, namely 2.5%, on each side. Further, since flattening deformation in the same direction is also caused in the joint to a similar degree, the actually appearing gap is further diminished below this value of 2.5%. This effect is similarly manifested when external compression causing flattening deformation is imposed on the joint and the concave deformation parts X and convex deformation parts Y of the annular section appear on either the joint or the pipe. Especially, the impingement of these concave deformation parts through the packing brings the axes of the joint and the pipe close to each other rather than separating them from each other. Thus, the joint receives a flattening deformation of the pipe based on the softness and elasticity thereof from the interior of the joint and a similar flattening deformation is also caused in the joint. In this structure, said two axes are stably located at the same position by virtue of the above-mentioned impinging elastic deformation, and not only an effect of preventing eccentric deviation between the two axes but also an effect of diminishing the above-mentioned gap d can be attained by the deformations of the pipe and the joint appearing in the same direction. As a result, there can be attained an effect of preventing partial enlargement of the gap or increase of the gap on one side.

It is necessary to impart to the joint wall structure a softness or elasticity sufficient to attain the abovementioned effect of preventing expansion or increase of the gap while exerting a sufficient durability to the inner pressure of water, avoiding degradation of the durability by reducing the thickness of the pipe portion 1 of the joint below a predetermined wall thickness and also avoiding unstable setting of the packing held on the inner circumference of the joint owing to the elastic deformation thereof.

In the present invention, the wall structure of the joint and the structural configuration of the co-operative packing are specifically determined. The provision for a packing holding groove wall involves a risk of increasing the rigidity of the joint. However, if a mountain-like or trapezoidal space in the form of a relatively deep packing anchoring portion 5b defined by front and rear inclined walls 6 and 7 of the joint are utilized as the packing holding annular groove, the necessary softness or elasticity is provided to the joint. The reason is that when a deformation-causing external force is applied, the front and rear inclined walls 6 and 7 are more readily deformed so that the mountain-like or trapezoidal space in the form of the relatively deep packing anchoring portion 5b defined by the walls 6 and 7 is expanded. In this arrangement, the packing holding groove can be formed without diminishing the wall thickness in the pipe portion 1' and degradation of the durability to the inner pressure is not caused at all. The packing 4 is formed so that it has the same outer shape as that of the mountain-like or trapezoidal space, and therefore, when flattening deformation is caused in this annular groove, the packing 4 is allowed to follow this deformation very stably and occurrence of such local torsion as will cause the packing 4 to come off from the groove 5 is effectively prevented.

The rationality of this arrangement will readily be understood from a comparison of a groove having a wall of a vertical section shown in FIG. 13-A with a groove having a wall of a mountain-like section shown in FIG. 13-B. When the entire joint undergoes flattening deformation, in the structure shown in FIG. 13-A, inward displacement I is caused on the groove end at the position of 0° where the external force G acts but outward displacement II is also caused, and at the position of 90° (270°) opposite deformation take place in the packing and the joint. Accordingly, the packing undergoes local compression and becomes unstable. As a result, the packing is caused to come off from the groove 5b' by torsion. On the other hand, in the structure shown in FIG. 13-B, at the position of 0° (180°) where flattening deformation takes place, outward displacement III is caused on the groove end, and at the position of 90° (270°) where convex deformation takes place, further outward displacement III is caused. Accordingly, the entire packing is only deformed from a circular annular shape to a flat annular shape and it does not receive any local compressive force. The joint having the front and rear inclined walls shown in FIG. 13-B has a softness or elasticity sufficient to allow deformation in a quantity of up to 5% of the diameter and stably hold the packing in the mountain-like space thereof. The softness or elasticity can be controlled to a desirable level by changing angles $\theta a$ and $\theta b$ of the inclined walls to the axis or appropriately combining these angles with the wall thickness. Effective angles are in the range of from 20° to 65°, preferably from 30° to 60°.

A soft and elastic synthetic resin joint 1 satisfying the above-mentioned novel requirements is arranged so as to exert a high connecting and bonding power inherently required of the joint. More specifically, a hard portion H having a wall thickness larger than the wall thickness of the pipe portion 1' of the joint (larger by 5 to 15%) is allotted to the connecting portion 5c of the inserted end 2' of the inserted pipe 2 and a soft portion S having a wall thickness substantially equal to the wall thickness of the pipe portion 1' (smaller or larger within 5%) is allotted to the packing holding groove portion. In this arrangement, the connecting portion can have a sufficient strength, and an angle $\theta c$ increasing inwardly of the joint can be imparted to this connecting portion 5c. Thus, freedom of connection of the inserted pipe 2 to the joint can be provided according to this angle $\theta c$, and characteristics of the soft pipe line can be increased. From experiences it has been confirmed that good results can be obtained when this angle $\theta c$ is up to 5°.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein:

FIG. 1 being a partially cut-out side view and FIGS. 2 to 6 being diagrams showing the various sections of the main parts thereof.

FIG. 9 is an enlarged view illustrating an example of the packing according to the present invention.

FIGS. 10 and 11 are sectional views showing other examples of the packing.

FIG. 11-A is a sectional view showing a pipe eccentric to a joint.

FIG. 11-B is a sectional view showing the state where flattening deformation is caused in an eccentric pipe.

DETAILED DESCRIPTION OF THE PREFERRED EMBODIMENTS

Figure 1:
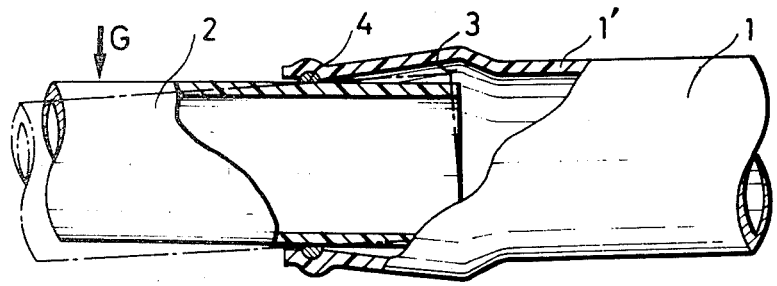
FIGS. 1 to 6 illustrate examples of known pipe joint structures.
Figure 2:
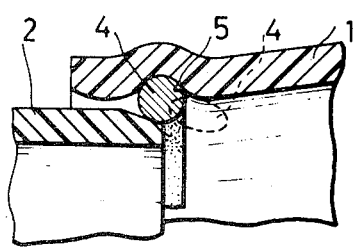
Figure 3:
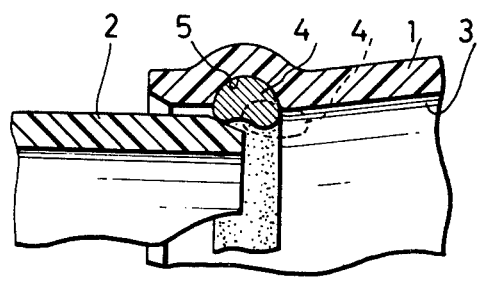

Embodiments of the soft joint of the present invention satisfying the three indispensable requirements, namely the requirement for imparting a sufficient softness or elasticity, the requirement for holding the packing stably and the requirement for maintaining a high durability, will now be described by reference to FIGS. 7 to 11. The structure of the soft joint of the present invention is not limited to these embodiments, but various modifications can be made without departing from the spirit of the invention.

Referring to the drawing, a packing attaching groove 5 is formed on the inner circumference of the top end portion of a pipe receiving socket 1 and a large-diameter portion 3 is formed on the interior side to leave a free gap from the periphery of the top end of a pipe inserting spigot 2. On the open side of the packing attaching groove 5, there are formed a relatively deep packing anchoring portion 5b including a front inclined face 6 and a rear inclined face 7 including first and second inclined walls 7a, 7b, respectively and a relatively shallow packing supporting portion 5a at a part inward of the anchoring portion 5b. On a packing 4 to be fitted in the packing attaching groove 5 are formed a fitting convex portion 8 to be fitted in the anchoring portion 5b and a compressible portion 9 located on the side confronting the supporting portion 5a and bulging inwardly beyond the outer diameter face line A of the pipe inserting spigot 2 on the inner circumference side of the packing 4. A tapered chamfer portion 10 is formed on the periphery of the top end portion of the pipe inserting spigot. An arrangement is made so that the following relation is established between the inclination angle $\theta 1$ of the chamber portion 10 on the top end of the pipe inserting spigot 2 and the inclination angle $\theta a$ of the rear inclined face 7 constituting the packing anchoring portion 5b:

$$45° < \theta a \leq \theta 1$$

and also the following relation is established according to conditions:

$$65° < \theta a < \theta 1 < 20°$$

When a joint is constructed by fitting the packing 4 in the packing attaching groove 5 of the pipe receiving faucet 1 and the pipe inserting spigot 2 is inserted in and connected to the packing 4, since the compressible portion 9 is formed on the packing 4 to maintain water tightness, at the step of insertion of the pipe inserting spigot 2 an inserting force is imposed on the packing 4 in the direction toward the interior of the pipe receiving faucet. At this point, the insertion resistance can be moderated by the presence of the chamfer portion 10 formed on the periphery of the top end of the packing 4. If the inclination angle $\theta a$ is adjusted to less than 65°, preferably less than 45°, the force resisting the insertion the force component in the direction toward the interior is deemed to be smaller than the force component in the direction crossing the pipe axis at a right angle as shown in FIG. 9. Accordingly, the compressible portion 9 of the packing mainly receives a force acting in the direction toward the supporting portion 5a, and hence, removal or rolling-out of the packing 4 can be prevented. If the inclination angle $\theta a$ is adjusted to less than 45°, the boundary region between the anchoring portion 5b and supporting portion 5a of the packing attaching groove 4 is constructed with a relatively gentle angle. Therefore, concentration of the external force on the packing attached in this region is reduced, and there can be attained an advantage that cracking is controlled and the durability is increased.

The movement of the packing 4 toward the interior is mainly inhibited by the rear inclined face 7 of the anchoring portion 5b. When the inclination angle θa of the rear inclined face 7 is made larger than the taper angle θ1 of the chamfer portion 10 of the pipe inserting spigot 2, the force of anchoring the packing 4 becomes larger than the force of moving the packing 4 toward the interior, and hence, removal or rolling-out of the packing 4 can be assuredly prevented.

Further, in the packing 4 per se, if an arrangement is made so that the relation of $S1 \geq S2$ is established between the sectional area S1 of the fitting convex portion 8 and the sectional area S2 of the compressible portion 9 and also the relation of $HS1 \geq HS2$ is established between the hardness HS1 of the fitting convex portion 8 and the hardness HS2 of the compressible portion 9, the packing anchoring force by the fitting convex portion 8 can always be kept larger than the thrust force imposed on the compressible portion 9 by insertion of the pipe inserting spigot 2. Accordingly, also by this arrangement, removal or rolling-out of the packing 4 can be prevented.

As will be apparent from the foregoing illustration, the highest effect can be attained when the relations of $45° > \theta a > \theta 1$, $S1 > S2$ and $HS1 > HS2$ are established among the above-mentioned factors θa, θ1, S1, S2, HS1 and HS2. It has been found that when all of the relations of $\theta 1 = \theta a$, $S1 = S2$ and $HS1 = HS2$ are established, removal of the packing 4 is caused according to some manner of imposition of the force. Accordingly, in the present invention it is preferred that one of the following requirements be satisfied:

(a) $45° > \theta a > \theta 1$, $S1 \geq S2$ and $HS1 \geq HS2$,
(b) $45° > \theta a \geq \theta 1$, $S1 \geq S2$ and $HS1 \geq HS2$, and
(c) $45° > \theta a \geq \theta 1$, $S1 \geq S2$ and $HS1 > HS2$.

Figure 4:
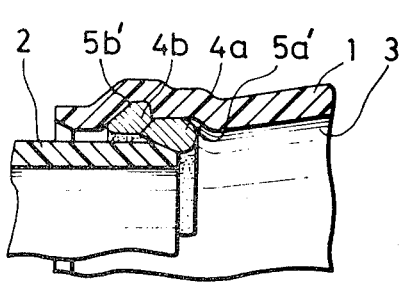
Figure 5:
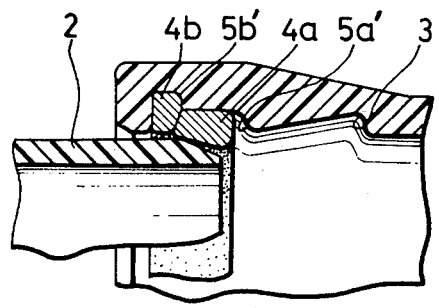
Figure 6:
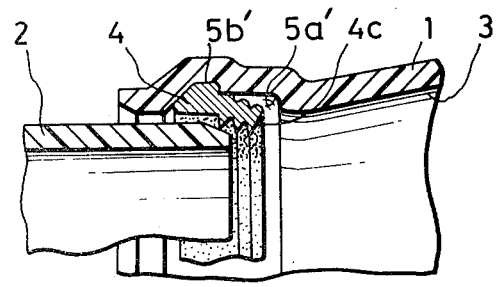
Figure 7:
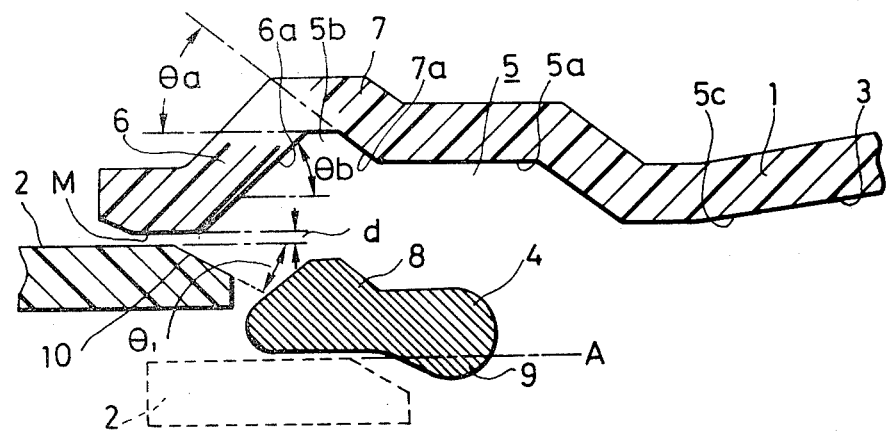
FIG. 7 is a view illustrating an embodiment of the structure of the pipe joint of the present invention.
Figure 8:
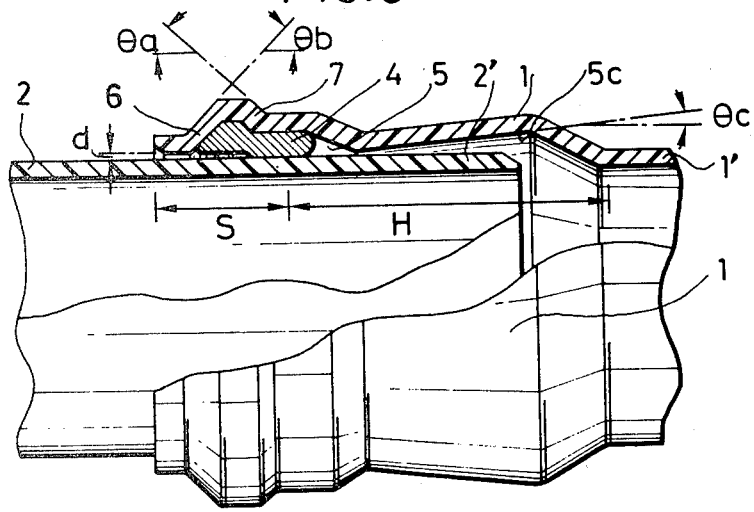
FIG. 8 is a partially cut-out side view showing an embodiment of the structure of the joint portion.
Figure 12:
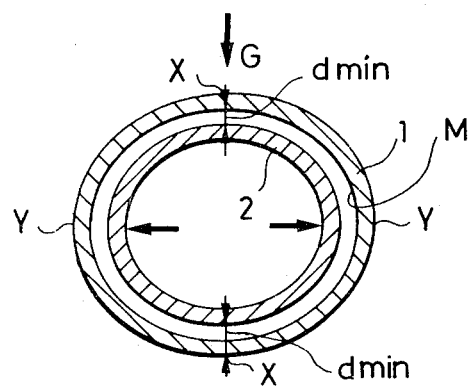
FIG. 12 is a sectional view showing the state where flattening deformation is caused due to impingement in a soft joint.
Figures 13A, 13B:
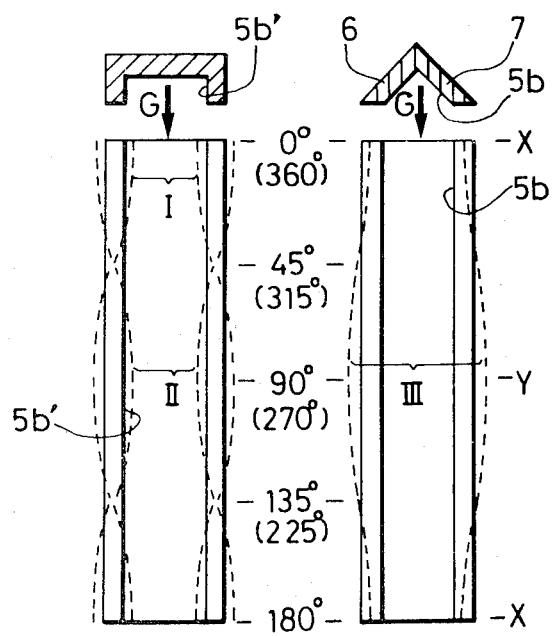
FIG. 13-A is a diagram illustrating a model of deformation taking place in a packing holding groove having a ]-shaped section, and FIG. 13-B is a diagram illustrating a model of deformation taking place in a packing holding groove having a V-shaped section.

As means for giving different degrees of the hardness to the fitting convex portion 8 and compressible portion 9 of the packing 4, there may be adopted a method in which the portions 8 and 9 are formed of different materials. In addition, there may be effectively adopted a method in which both the portions 8 and 9 are formed of the same material and a void 11 is formed in the compressible portion 9 alone as shown in FIG. 10 and a method in which the compressible portion 9 is shaped to have a resilient structure and the hardness of the compressible portion 9 is reduced physically and structurally as shown in FIG. 11. Moreover, there can be adopted a method in which a reinforcing linear member is embedded in the fitting portion 8 to increase substantially the hardness of the fitting portion 8. When the fitting convex portion 8 and compressible portion 9 are formed of different materials, there is the above-mentioned risk that cracks will be formed in the connecting boundary region. In the present invention, since the inclination angle of the rear inclined face of the packing anchoring portion 5b is adjusted to less than 65° so that the stress is hardly concentrated on the connecting edge portion, formation of cracks can be remarkably prevented as compared with the case of the above-mentioned conventional structures shown in FIGS. 4 and 5.

The joint of the present invention is applied to the connection of pipes having a high flexibility, such as synthetic resin pipes, e.g., hard vinyl chloride resin pipes, fiber-reinforced plastic tubes and composite pipes composed of a fiber-reinforced plastic material and a resinous mortar material, and therefore, characteristics of the joint of the present invention are different from those of joints to be used for connection of cast iron pipes and the like.

As will be apparent from the foregoing illustration, the soft pipe joint of the present invention has very rational structural characteristics, and by virtue of these characteristics, there can be attained the following advantageous improvements.

(1) The joint has a packing-connecting structure capable of expansion and contraction in the direction of the pipe axis and a free gap is left between the interior portion of the faucet and the periphery of the pipe inserting spigot. Accordingly, the joint is allowed to be displaced and deformed also in the bending direction. Therefore, the external force imposed on the joint is absorbed by displacement and deformation of the joint and breakage of the joint can be prevented substantially completely.

(2) Although external forces are frequently imposed on the packing by expansion, contraction and bending of the joint, since the setting property and durability of the packing are structurally enhanced, a high degree of water tightness can be maintained for a long time.

(3) Since there is not a risk of coming-off or rolling-out of the packing from the predetermined position at the inserting and connecting step, the connecting operation can be accomplished very easily and precisely.

Obviously, many modifications and variations of the present invention are possible in light of the above teachings. It is to be understood therefore that within the scope of the appended claims this invention may be practiced otherwise than as specifically described herein.

What is claimed as new and desired to be secured by Letters Patent of the United States is:

1. A soft deformable synthetic resin pipe joint for telescopically connecting a synthetic resinous pipe to a pipe receiving socket comprising:

said socket including an end portion and a packing holding groove formed on an inner circumferential wall of said socket;

a packing member held in said groove of said pipe receiving socket and disposed so as to sealingly engage the pipe and the socket and to provide a gap between the inner circumferential portion of said end portion of said socket and the periphery of said pipe inserted therein wherein the outer periphery portion of the end of said pipe forms a chamfered portion, said packing member including a convex outer portion and an a radially inwardly extending compressible portion of smaller diameter than the outside diameter of said pipe;

a front radially outwardly flared and first and second radially inwardly flared rear inclined walls formed on the inner and outer periphery of said socket to define said groove, said front wall interconnecting with said first rear inclined wall;

said socket further comprising a supporting portion interconnecting said first and second rear inclined walls, said joint comprising a material of such softness and elasticity that upon external compression of each of said inclined walls, deformation expanding of the gap between said front and first rear walls occurs and inclined faces corresponding to said front and first rear inclined walls are formed on the backing member such that the axis of said pipe is substantially aligned with the axis of said joint upon flattening deformation of said joint.

2. A pipe joint as set forth in claim 1 wherein said front and first rear inclined walls have an inclination angle of from 20° to 65°, whereby the joint is allowed to undergo elastic flattening deformation upon application of an external force in a quantity of up to 5% of the diameter thereof.

3. A pipe joint as set forth in claim 1 wherein the chamfer angle $\theta_1$ of the pipe, the inclination angle $\theta_a$ of the first rear inclined face of the packing, the sectional area S1 of the convex outer portion of the packing which serves to occupy the groove formed between said front and first rear inclined walls, the hardness HS1 of said convex portion, the sectional area S2 of said compressible portion and the hardness HS2 of said compressible portion have the relationship:

$45° > \theta_a \geq \theta_1$, $S1 \geq S2$ and $HS1 > HS2$

4. A pipe joint as set forth in claim 1, wherein the thickness of said front and first rear inclined walls is substantially the same as the thickness of the pipe portion and the thickness of the wall of the socket is larger by up to 20% than the thickness of the pipe portion.

5. A pipe joint as set forth in claim 1, said socket further comprising a connecting portion which comprises a rear radially outwardly flared inclined wall such that said first and second rear walls are disposed between said front and rear radially outwardly flared walls.

6. A pipe joint as set forth in claim 1, wherein said pipe joint comprises vinyl chloride resin.

7. A pipe joint as set forth in claim 1, wherein said pipe joint comprises fiber-reinforced plastic.

8. A pipe joint as set forth in claim 1, wherein said pipe joint comprises a composite of fiber-reinforced plastic material and a resinous mortar material.

9. A pipe joint as set forth in claim 1 wherein the chamfer angle $\theta_1$ of the pipe, the inclination angle $\theta_a$ of the first rear inclined face of the packing, the sectional area S1 of the convex outer portion of the packing which serves to occupy the groove formed between said front and first rear inclined walls, the hardness HS1 of said convex portion, the sectional area S2 of said compressible portion and the hardness HS2 of said compressible portion have the relationship:

$45° > \theta_a \geq \theta_1$, $S1 \geq S2$ and $HS1 > HS2$.

10. A pipe joint as set forth in claim 1 wherein the chamfer angle $\theta_1$ of the pipe, the inclination angle $\theta_a$ of the first rear inclined face of the packing, the sectional area S1 of the convex outer portion of the packing which serves to occupy the groove formed between said front and first rear inclined walls, the hardness HS1 of said convex portion, the sectional area S2 of said compressible portion and the hardness HS2 of said compressible portion have the relationship:

$45° > \theta_a > \theta_1$, $S1 \geq S2$ and $HS1 \geq HS2$

* * * * *